United States Patent
Sun (10) Patent No.: US 11,645,914 B2
(45) Date of Patent: May 9, 2023

(54) APPARATUS AND METHOD FOR CONTROLLING DRIVING OF VEHICLE

(71) Applicant: DENSO CORPORATION, Kariya (JP)

(72) Inventor: Litian Sun, Kariya (JP)

(73) Assignee: DENSO CORPORATION, Kariya (JP)

( * ) Notice: Subject to any disclaimer, the term of this patent is extended or adjusted under 35 U.S.C. 154(b) by 304 days.

(21) Appl. No.: 16/925,720

(22) Filed: Jul. 10, 2020

(65) Prior Publication Data
US 2021/0012662 A1   Jan. 14, 2021

(30) Foreign Application Priority Data

Jul. 12, 2019  (JP) .............................. JP2019-129845

(51) Int. Cl.
*B60W 30/095* (2012.01)
*G08G 1/16* (2006.01)
*B60W 30/09* (2012.01)
*B60W 50/14* (2020.01)
(Continued)

(52) U.S. Cl.
CPC ............. *G08G 1/164* (2013.01); *B60W 30/09* (2013.01); *B60W 30/0956* (2013.01); *B60W 50/14* (2013.01); *G01C 21/3453* (2013.01); *G01C 21/3626* (2013.01); *G01C 21/3664* (2013.01); *B60W 2050/146* (2013.01)

(58) Field of Classification Search
CPC .. G08G 1/164; B60W 30/09; B60W 30/0956; B60W 50/14; B60W 2050/146; B60W 2050/0075; B60W 2556/45; B60W 2556/50; B60W 50/082; B60W 50/085; B60W 60/0013; B60W 60/0015; B60W 50/0097; B60W 50/0098; G01C 21/3453; G01C 21/3626; G01C 21/3664
See application file for complete search history.

(56) References Cited

U.S. PATENT DOCUMENTS 10,053,088 B1 * 8/2018 Askeland ............ B60W 40/109
2016/0280134 A1  9/2016 Miura et al.
2017/0327094 A1 11/2017 Inoue et al.
(Continued)

FOREIGN PATENT DOCUMENTS

JP  2013-109705 A  6/2013
JP  2017-021651 A  1/2017
(Continued)

*Primary Examiner* — Jason Holloway
(74) *Attorney, Agent, or Firm* — Maschoff Brennan (57) ABSTRACT

In an apparatus for controlling driving of a vehicle, an input interface is configured to receive a reassurance indicator entered by a passenger of the vehicle. The reassurance indicator represents a preference of the passenger for security. A communication unit is configured to communicate with a plurality of roadside devices located in respective potentially risky areas where the vehicle may collide with a moving object. Each roadside device is configured to evaluate the collision possibility with the moving object. A vehicle controller is configured to, if receiving an evaluation result from the roadside device located in the potentially risky area forward of the own vehicle showing that the own vehicle is unlikely to collide with the moving object in the potentially risky area forward of the vehicle, perform avoidance control to control driving of the vehicle according to the reassurance indicator.

9 Claims, 10 Drawing Sheets

(51) Int. Cl.
*G01C 21/36* (2006.01)
*G01C 21/34* (2006.01)

(56) References Cited

U.S. PATENT DOCUMENTS

| | | |
|---|---|---|
| 2017/0334454 A1 | 11/2017 | Abe et al. |
| 2018/0208198 A1 | 7/2018 | Urano et al. |
| 2018/0218230 A1 | 8/2018 | Naka et al. |
| 2018/0231974 A1 | 8/2018 | Eggert et al. |
| 2018/0281810 A1 | 10/2018 | Tochioka et al. |
| 2020/0064851 A1* | 2/2020 | Wilkinson ............ G05D 1/0088 |
| 2020/0081611 A1* | 3/2020 | Beaurepaire ........ G06F 3/04847 |

FOREIGN PATENT DOCUMENTS

| | | |
|---|---|---|
| JP | 2017-043268 A | 3/2017 |
| JP | 2018-052160 A | 4/2018 |
| JP | 2018-106351 A | 7/2018 |
| JP | 2018-173800 A | 11/2018 |
| JP | 2018-195289 A | 12/2018 |

* cited by examiner

⊘ : LOCATIONS WHERE ROADSIDE DEVICES ARE INSTALLED

FIG.10

| | WEATHER |
|---|---|
| TIME OF DAY | PROBABILITY OF OCCURRENCE OF LIKELY-TO-RUSH-OUT OBJECT |

⊘ BLIND INTERSECTION

FIG.15

| TIME | WEEKDAYS |
|---|---|
| 7 | [00] [15] [30] [45] |
| 8 | 00 [15] 30 [45] |
| 9 | 00 15 30 45 |
| ... | |
| 17 | 00 15 30 [45] |
| 18 | [00] [30] |

☐ RECOMMENDATIONS TO SPEED-CONCERNED PEOPLE
UNMARKED  RECOMMENDATIONS TO SECURITY- CONCERNED PEOPLE

FIG.16

APPARATUS AND METHOD FOR CONTROLLING DRIVING OF VEHICLE

CROSS-REFERENCE TO RELATED APPLICATION

This application is based on and claims the benefit of priority from earlier Japanese Patent Application No. 2019-129845 filed Jul. 12, 2019, the description of which is incorporated herein by reference.

BACKGROUND

Technical Field

The present disclosure relates to a vehicle control apparatus and a vehicle control method.

Related Art

A vehicle control apparatus is known that can increase a passenger's feeling of security or comfort.

The above known vehicle control apparatus is set on a vehicle. A movement request setter of the above known vehicle control apparatus sets movement request base values to direct the self-driving operations of the own vehicle based on information acquired from at least one of the following devices: an own-vehicle information detector, a surroundings information detector, or a road information detector. When self-driving of the own vehicle is performed, a movement request corrector sets movement request correction values to correct the movement request base values, based on passenger information acquired from a passenger state detector. Movement request values are calculated by correcting the movement request base values with the movement request correction values. Self-driving control is performed based on the calculated movement request values.

A self-driving system is also known as able to readily change travel-related parameters to prescribed values.

The above known self-driving system includes a parameter setter configured to receive passenger input travel-related parameters for self-driving control of a vehicle with the above known self-driving system, a cruise controller configured to perform self-driving control in response to the parameters set by the parameter setter, and a cancelling operation input configured to receive a change-cancelling operation by the passenger, which restores the parameters to prescribed values once receiving a change-cancelling operation input.

A collision-possibility evaluation apparatus is also known for acquiring additional information about surrounding vehicle for cruise control of a self-driving vehicle via communications.

The above known collision-possibility evaluation apparatus determines whether the own vehicle and a surrounding vehicle are likely to contact each other at an intersection where the own vehicle is expected to pass and the other vehicle is expected to pass in a crossing direction, based on vehicle information and surrounding vehicle information. In response to determining that the own vehicle and a surrounding vehicle are likely to contact each other, the above known collision-possibility evaluation apparatus predicts positional relationships of the two vehicles for the moment when the own vehicle passing the intersection. Then the above known collision-possibility evaluation apparatus sets a control pattern of the travel speed of the own vehicle responsive to the predicted positional relationships.

DESCRIPTION OF SPECIFIC EMBODIMENTS

In the above known vehicle control apparatus as disclosed in JP-A-2017-21651, the movement request values that lead to anxiety reduction include movement request values for more safely controlling the own vehicle. For example, anxiety or discomfort is considered to be reduced as values indicative of a degree of movement, such as a vehicle speed, a longitudinal acceleration, a lateral acceleration, a rotational speed and the like, decrease. Therefore, the movement request values are set so as to reduce such values.

In the above known self-driving system as disclosed in JP-A-2018-118609, travel-related parameters are parameters related to movement of the own vehicle. The parameters related to movement of the own vehicle include, for example, a speed of the own vehicle V, an offset amount of the vehicle V from the center of a lane in which the vehicle V is traveling (a position of the own vehicle V in the vehicle-widthwise direction). The parameters related to movement of the own vehicle may further include a separation distance between the preceding vehicle and the own vehicle V, an acceleration/deceleration of the own vehicle V in the travel direction, a lateral acceleration that is an acceleration in the vehicle-widthwise direction. A passenger of the own vehicle V can set these parameters to desired values using a parameter input. However, too many parameters need to be input by the passenger. Thus, the passenger has to be familiar with driving.

In the above known collision-possibility evaluation apparatus as disclosed in JP-A-2018-173800, the likelihood that the own vehicle will contact a surrounding vehicle is estimated using communications. Vehicle control is performed based on the estimated likelihood. For example, if it is estimated that the own vehicle is unlikely to contact a surrounding vehicle, the own vehicle cancels deceleration and returns to normal speed running, which will reduce a passenger's feeling of security.

In view of the above, it is desired to have a technique for performing different vehicle control strategies according to the presence of a passenger. If a passenger is onboard, it reassures the passenger responsive to his or her preference for security with simplified input, and different vehicle control is conducted without the presence of a passenger.

A first aspect of the disclosure provides an apparatus for controlling driving of a vehicle, including: an input interface configured to receive a reassurance indicator entered by a passenger of the vehicle, the reassurance indicator representing the preference of the passenger for security over speed; a communication unit configured to communicate with multiple roadside devices which are located in respective potentially risky areas where the vehicle may collide with a moving object, and configured to evaluate the possibility of collision; and a vehicle controller configured to perform avoidance control to control driving of the vehicle according to the reassurance indicator set by the passenger, even if the evaluation from the roadside devices shows that the collision possibility is low.

A second aspect of the disclosure provides an apparatus for controlling driving of a vehicle, including: a communication unit configured to communicate with multiple roadside devices located in respective potentially risky areas where the vehicle may collide with a moving object, each roadside device being configured to evaluate the collision possibility; and a vehicle controller configured to perform avoidance control to control driving of the vehicle with a passenger onboard, and perform no avoidance control without a passenger onboard under the circumstances that the evaluation result from the roadside device shows that the collision possibility is low.

A third aspect of the disclosure provides a method for controlling driving of a vehicle, including: an input interface receiving a reassurance indicator entered by a passenger of the vehicle, the reassurance indicator representing the preference of the passenger for security; a communication unit communicating with a plurality of roadside devices located in respective potentially risky areas where the vehicle may collide with a moving object, each roadside device being configured to evaluate the collision possibility with the moving object; and if receiving an evaluation result from the roadside device located in the potentially risky area forward of the own vehicle showing that the own vehicle is unlikely to collide with the moving object in the potentially risky area forward of the vehicle, a vehicle controller performing avoidance control to control driving of the vehicle according to the reassurance indicator.

A fourth aspect of the disclosure provides a method for controlling driving of a vehicle, including: a communication unit communicating with a plurality of roadside devices located in respective potentially risky areas where the vehicle may collide with a moving object, each roadside device being configured to configured to evaluate the collision possibility; and under the circumstances that the evaluation result from the roadside device shows that the collision possibility is low, a vehicle controller performing avoidance control to control driving of the vehicle with a passenger onboard, and performing no avoidance control without a passenger onboard.

A fifth aspect of the disclosure provides a non-transitory computer readable medium having stored thereon instructions executable by a computer to cause the computer to perform functions including: receiving a reassurance indicator entered by a passenger of the vehicle, the reassurance indicator representing the preference of the passenger for security; communicating with a plurality of roadside devices located in respective potentially risky areas where the vehicle may collide with a moving object, each roadside device being configured to evaluate the collision possibility with the moving object; and if receiving an evaluation result from the roadside device located in the potentially risky area forward of the own vehicle showing that the own vehicle is unlikely to collide with the moving object in the potentially risky area forward of the vehicle, performing avoidance control to control driving of the vehicle according to the reassurance indicator.

A sixth aspect of the disclosure provides a non-transitory computer readable medium having stored thereon instructions executable by a computer to cause the computer to perform functions including: communicating with a plurality of roadside devices located in respective potentially risky areas where the vehicle may collide with a moving object, each roadside device being configured to configured to evaluate the collision possibility; and under the circumstances that the evaluation result from the roadside device shows that the collision possibility is low, performing avoidance control to control driving of the vehicle with a passenger onboard, and performing no avoidance control without a passenger onboard.

The above aspects of the present disclosure can provide vehicle control responsive to an easily entered preference for security or vehicle control reassuring a passenger in the presence of the passenger.

One exemplary embodiment of the present disclosure will now be overviewed prior to describing the embodiments in detail.

Overview of Embodiments

In situations where infrastructure sensors provide information about areas where a self-driving vehicle is unable to detect an object, it is required to adjust the way to use the information in response to the presence or absence of a passenger and a passenger preference in the presence of a passenger.

In the present embodiment, when it has been confirmed using the infrastructure camera that there are no moving objects in the area which the self-driving vehicle is unable to detect, and there is no passenger onboard, the self-driving vehicle passes through the area at a normal speed without deceleration, thereby reducing the travel time. When it has been confirmed by the infrastructure camera that there are no moving objects in the area which the self-driving vehicle is unable to detect, but with a passenger onboard, the self-driving vehicle decelerates before entering the area.

The passenger is allowed to input a request via a human interface within the self-driving vehicle. The above function is adjusted in response to the request.

Figure 1:
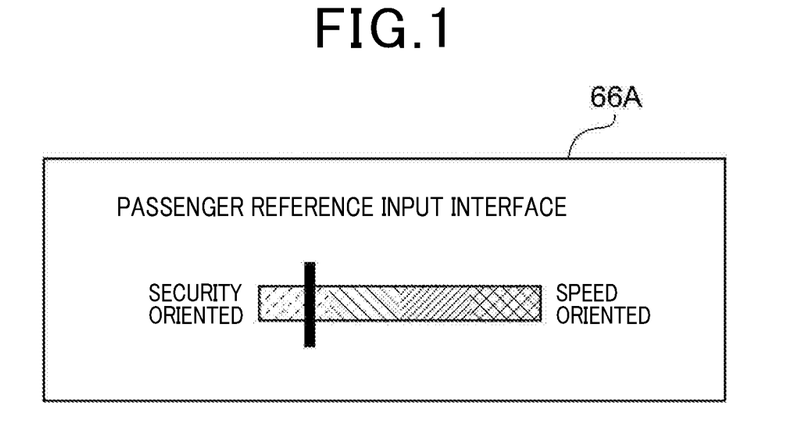
FIG. 1 is an example image of a passenger preference input interface.

More specifically, as shown in FIG. 1, a reassurance indicator representing a preference for security is received from a passenger. Once a safety check has passed in a potentially risky area, avoidance control, such as deceleration-in-advance, is adjusted and performed in response to the reassurance indicator.

In such a way, the passenger's concern about collision with rush-out object from a blind area is addressed. And the vehicle control measures to deal with such potential collision are adjustable according to the passenger's preference.

Figure 2:
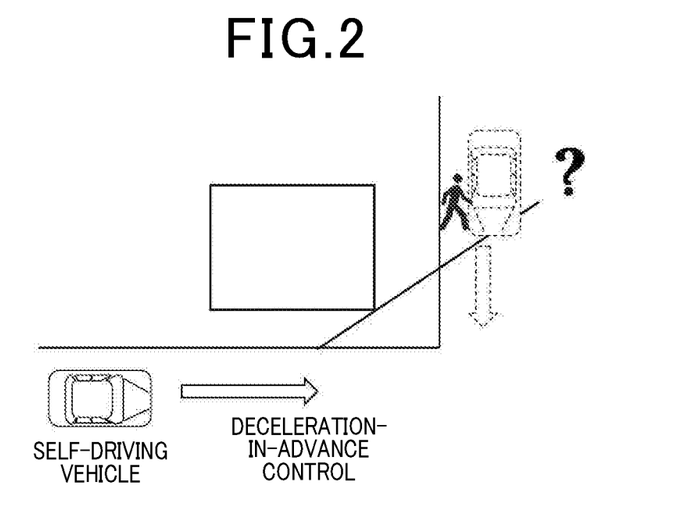
FIG. 2 is an illustration of deceleration-in-advance in a potentially risky area.

For example, once it has been confirmed from images captured by a camera installed at a blind intersection as shown in FIG. 2 that no moving objects will rush out onto the road, a taxi that is a self-driving vehicle passes the blind intersection without deceleration when carrying no passenger, but decelerates prior to passing the blind intersection when carrying a passenger.

In response to a preference of the passenger for security, a route to a destination is generated with both travel time reduction and passenger's security feeling at the blind intersections taken into consideration.

System Configuration of Self-Driving Assistance System

Figure 3:
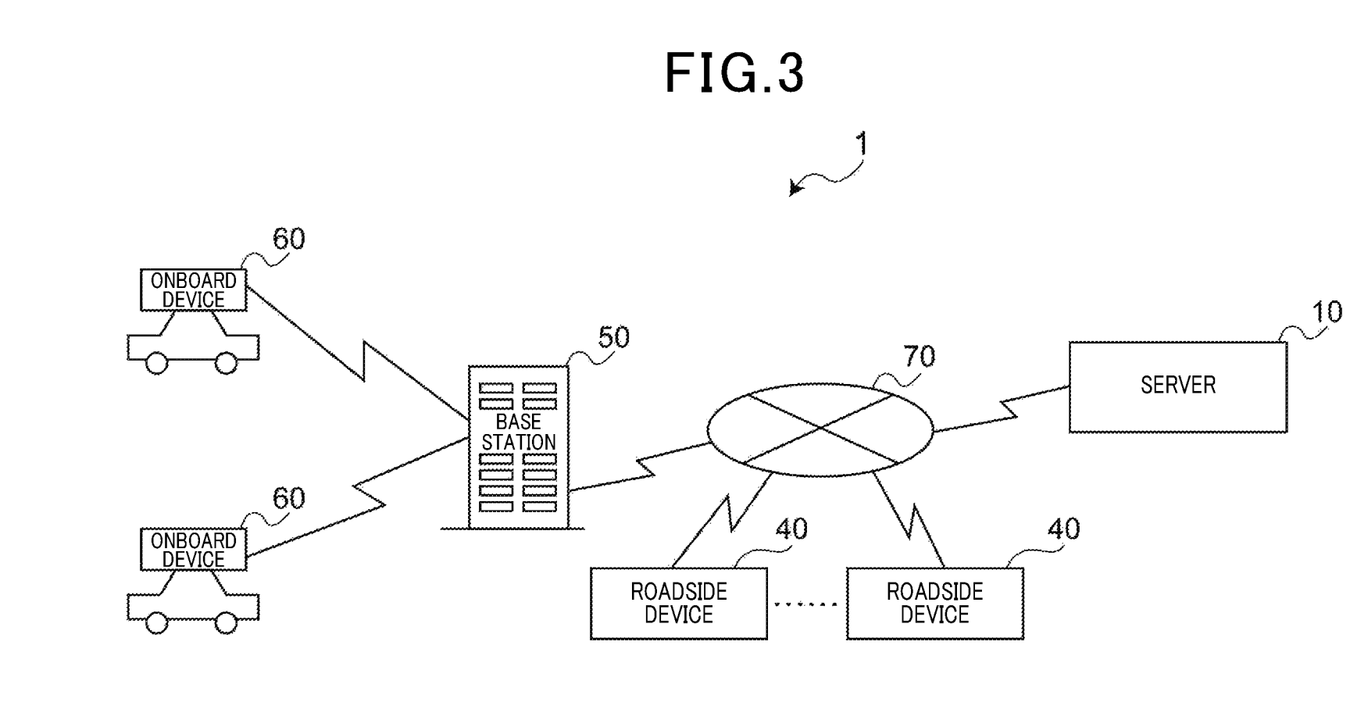
FIG. 3 is a block diagram of a self-driving assistance system.

As shown in FIG. 3, the self-driving assistance system 1 of the present embodiment includes a server 10 located within a control center, a plurality of roadside devices 40, a base station 50, and a plurality of onboard devices 60 each mounted to a respective one of a plurality of vehicles. The roadside devices 40, the base station 50, and the server 10 are communicably connected to a network 70 such as the Internet. The base station 50 and the onboard devices 60 are communicably connected via wireless communications. Each onboard device 60 is an example of a vehicle control apparatus.

Each roadside device 40 is installed in a potentially risky area where a vehicle may collide with another moving object, and is configured to evaluate whether a vehicle approaching an installation location of the roadside device 40 and another moving object are likely to collide with each other, and transmit an evaluation result to the vehicle approaching the potentially risky area.

The potentially risky area refers to an area from which a moving object may rush out, such as a blind intersection, an entry/exit of a store, an entry/exit of parking lot, or lane in which many vehicles are parked.

Each vehicle carrying a respective one of the onboard devices 60 is a self-driving vehicle, for example, a taxi having a self-driving function.

Each onboard device 60 transmits information of the own vehicle to the roadside devices 40 and the server 10.

Each onboard device 60 includes a central processing unit (CPU), a random-access memory (RAM), and a read-only memory (ROM) storing programs, and includes the following functional blocks.

Figure 4:
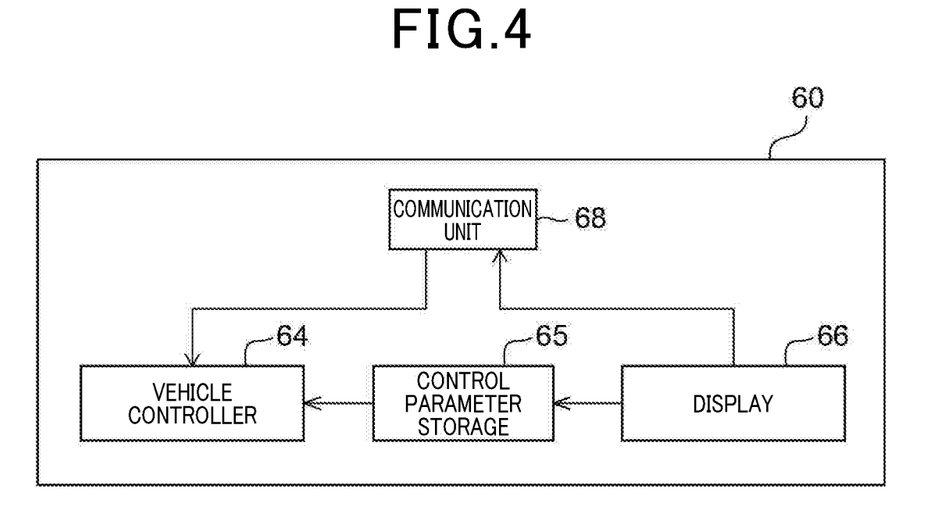
FIG. 4 is a functional block diagram of each onboard device.

As shown in FIG. 4, each onboard device 60 includes a vehicle controller 64, a control parameter storage 65, a display 66 (serving as a notifier), and a communication unit 68.

The display 66 is a touch-screen display with input interface and display functions. The display 66 is configured to display various settings and receive setting inputs. More specifically, the display 66 displays a passenger preference input interface 66A (serving as an input interface) as shown in FIG. 1 for entering a reassurance indicator representing a preference of a passenger for security and receives the reassurance indicator. In an example of FIG. 1, the display 66 receives, as the reassurance indicator, a value indicative of a balance between security-oriented and speed-oriented. The display 66 further displays an interface to receive destination input.

The display 66 stores the received reassurance indicator, the destination, and the current location in the control parameter storage 65, and transmits them to the server 10 via the communication unit 68.

The communication unit 68 is configured to communicate with the base station 50 using an existing means, such as a mobile network, Wi-Fi or the like.

The communication unit 68 is configured to receive from the server 10 an optimum route to the destination.

The vehicle controller 64 is configured to perform self-driving of the vehicle carrying the onboard device 60 (also referred to as an own vehicle) along the optimum route to the destination using detection results from the various onboard sensors.

The vehicle controller 64 is configured to, when a certain roadside device 40 is located at a blind intersection forward of the own vehicle along the route, transmit a safety check request to the roadside device 40 via the communication unit 68.

The vehicle controller 64 is configured to, in response to, in the presence of a passenger onboard, receiving an evaluation result that the own vehicle is unlikely to collide with another moving object from the roadside device 40 located at the blind intersection forward of the own vehicle along the route, perform avoidance control more strongly to reassure the passenger if the reassurance indicator (passenger's preference input) is more security-oriented, and perform avoidance control less strongly if the passenger's preference input is more speed-oriented.

Figure 5:
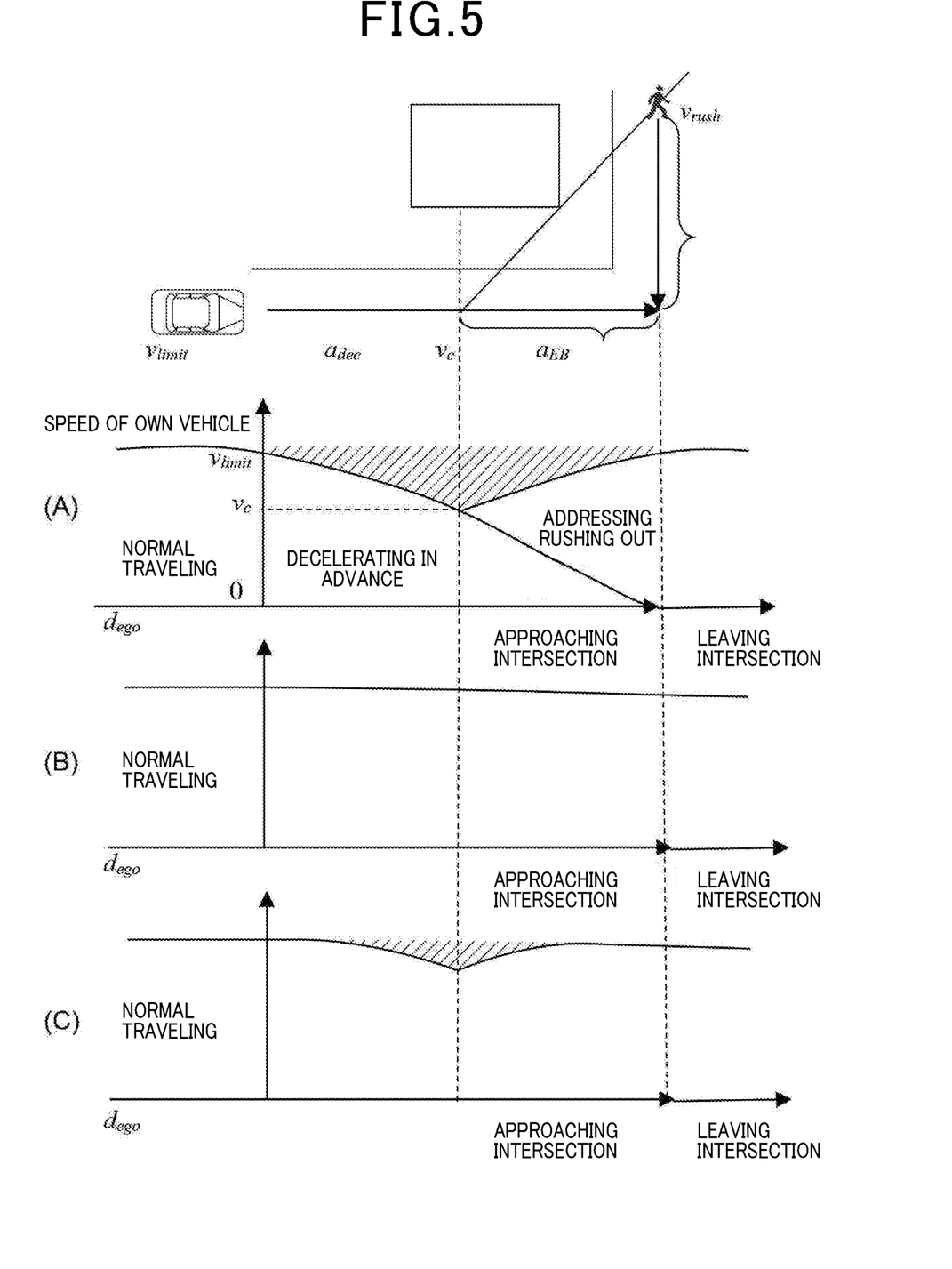
FIG. 5 is an illustration of deceleration-in-advance control.

For example, when the reassurance indicator is security-oriented, the deceleration-in-advance magnitude is set to 1. Then, even if an evaluation result that the own vehicle is unlikely to collide with another moving object is received from the roadside device 40, the vehicle controller 64, as shown in (A) of FIG. 5, controls the own vehicle to perform deceleration-in-advance until reaching a specific location that allows the passenger to have visual confirmation that an moving object is unlikely to rush out onto a road. A target speed at this specific location is set to a speed Vc that allows the own vehicle to reduce the speed at a predetermined deceleration rate aEB (at or close to a normal deceleration shown in FIG. 6) and stop at the intersection.

When the reassurance indicator is speed-oriented, the deceleration-in-advance magnitude is set to 0. Then, in response to receiving from the roadside device 40 an evaluation result that the own vehicle is unlikely to collide with another moving object, the vehicle controller 64, as shown in (B) of FIG. 5, controls the own vehicle so as to perform no deceleration-in-advance.

When the reassurance indicator is neither security-oriented nor speed-oriented, the deceleration-in-advance magnitude is set to 0.5. Then, even if an evaluation result that the own vehicle is unlikely to collide with another moving object is received from the roadside device 40, the vehicle controller 64, as shown in (C) of FIG. 5, controls the own vehicle to perform deceleration-in-advance until reaching a specific location that allows visual confirmation that an moving object is unlikely to rush out onto a road. A target speed at this specific location is set higher than the speed Vc that allows the own vehicle to reduce the speed at a predetermined deceleration rate aEB (about a deceleration during sudden braking shown in FIG. 6) and stop at the intersection.

The vehicle controller 64 is configured to, if an evaluation result that the own vehicle is unlikely to collide with another moving object has not been received from the roadside device 40 located at the blind intersection forward of the own vehicle along the route, control the own vehicle to perform deceleration-in-advance until reaching a specific location that allows visual confirmation that an moving object is unlikely to rush out onto a road. The vehicle controller 64 controls the own vehicle to perform slower deceleration-in-advance with a smaller deceleration rate adec as the reassurance indicator is more security-oriented.

The vehicle controller 64 controls the own vehicle to perform deceleration-in-advance at a larger deceleration rate adec as the reassurance indicator is more speed-oriented.

Figure 6:
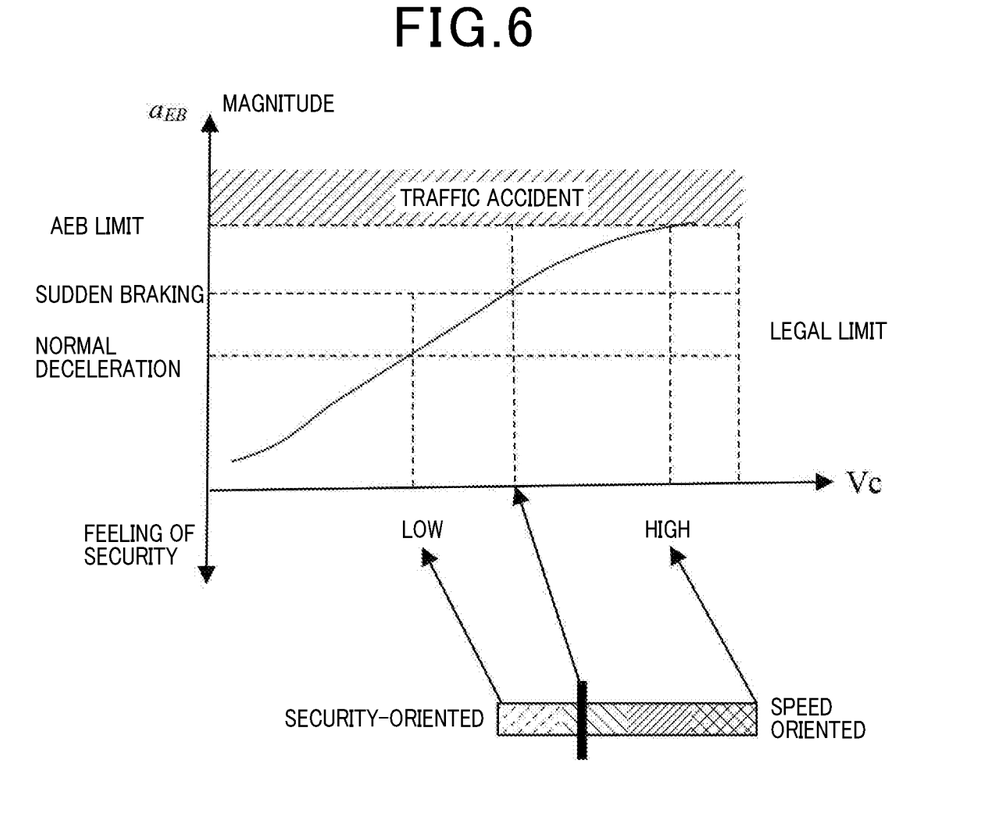
FIG. 6 is an illustration of how to determine a deceleration during deceleration-in-advance.

For example, as shown in FIG. 6, if the reassurance indicator is security-oriented, the deceleration rate aEB is set to a normal rage (for example, within a deceleration range of 0.2 to 0.5 g where g represents the acceleration of gravity), thereby providing a low vehicle speed at a specific location that allows visual confirmation that an moving object is unlikely to rush out onto a road.

If the reassurance indicator is speed-oriented, the deceleration rate aEB when the own vehicle stops at the intersection is set to a deceleration (for example, within a deceleration range of 0.5 to 0.8 g) close to an autonomous emergency braking (AEB) limit, thereby providing a higher vehicle speed at a specific location that allows visual confirmation that an moving object is unlikely to rush out onto a road.

If the reassurance indicator is neither security-oriented nor speed-oriented, the deceleration rate aEB when the own vehicle stops at the intersection is set to a deceleration during sudden braking (lower than the AEB limit), thereby providing a relatively high vehicle speed at a specific location that allows visual confirmation that an moving object is unlikely to rush out onto a road.

In the present embodiment, it is assumed that the moving object that may collide with the own vehicle is a pedestrian and the pedestrian may rush out onto a road at a walking speed Vrush.

The vehicle controller 64 is configured to, in response to, without passenger onboard, receiving an evaluation result that the own vehicle is unlikely to collide with another moving object from the roadside device 40 located at a blind intersection forward of the own vehicle along the route, controls the own vehicle so as to perform no deceleration-in-advance.

Each roadside device 40 includes a central processing unit (CPU), a random-access memory (RAM), and a read-only memory (ROM) storing programs, and includes the following functional blocks.

Figure 7:
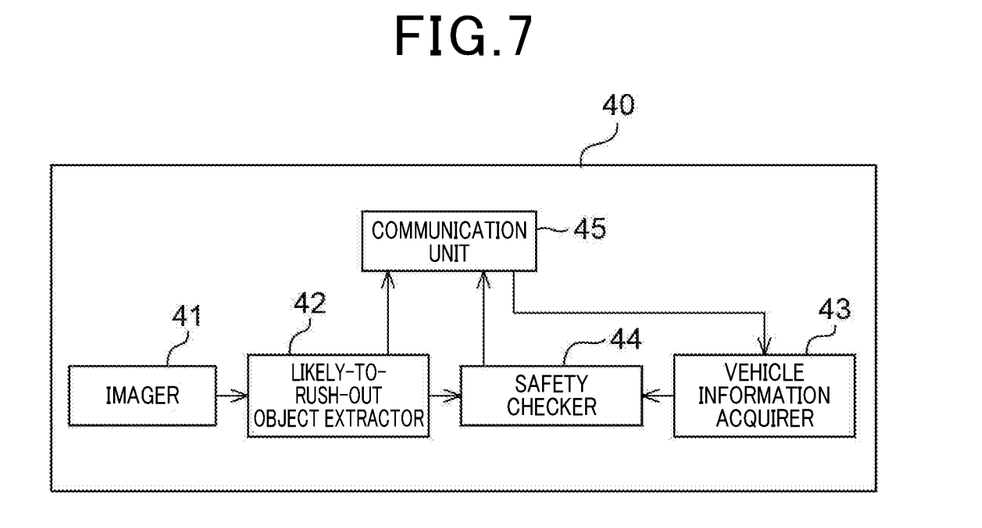
FIG. 7 is a functional block diagram of each roadside device.

As shown in FIG. 7, each roadside device 40 includes an imager 41, a likely-to-rush-out object extractor 42, a vehicle information acquirer 43, a safety checker 44, and a communication unit 45.

The imager 41 captures images of a potentially risky area. For example, the imager 41 captures images of a pedestrian and/or a bicycle approaching a blind intersection, or images of an area where vehicles pass through.

The likely-to-rush-out object extractor 42 extracts from the images captured by the imager 41 a pedestrian, a bicycle, or a vehicle approaching the blind intersection as a moving object that may rush out onto a road.

The vehicle information acquirer 43 acquires a safety check request via a communication unit 45.

The safety checker 44 is configured to, in response to the vehicle information acquirer 43 receiving the safety check request, evaluate whether the vehicle is likely to collide with another moving object, based on the result of extraction by the likely-to-rush-out object extractor 42. More specifically, if a pedestrian, a bicycle, or a vehicle approaching the blind intersection is extracted by the likely-to-rush-out object extractor 42 in an area invisible to the vehicle, the safety checker 44 evaluates that the vehicle has a possibility to collide with another moving object. If none of a pedestrian, a bicycle, and a vehicle approaching the blind intersection is extracted by the extractor 42, the safety checker 44 evaluates that the vehicle is unlikely to collide with any other moving object.

The safety checker 44 transmits to the onboard device 60 having transmitted the safety check request an evaluation result via the communication unit 45.

The communication unit 45 transmits to the server 10 at any time a result of extraction by the likely-to-rush-out object extractor 42.

The server 10 includes a central processing unit (CPU), a random-access memory (RAM), and a read-only memory (ROM) storing programs for executing various processes described later, and includes the following functional blocks.

Figure 8:
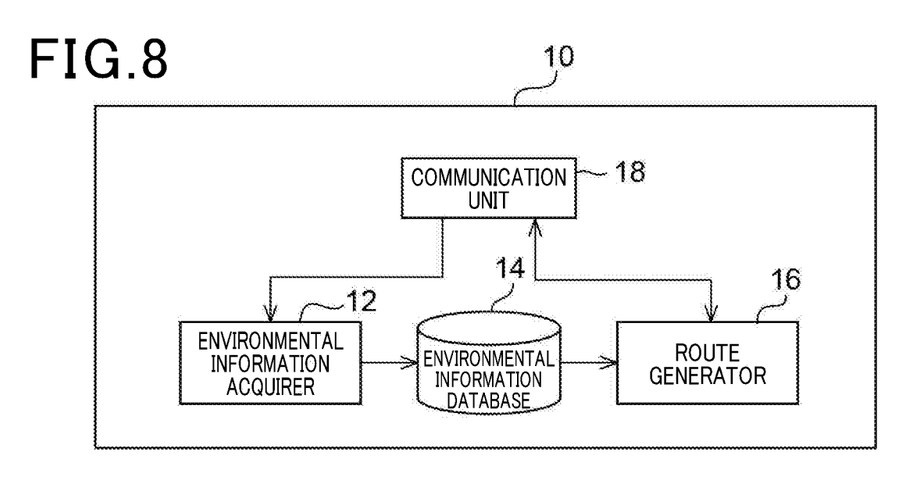
FIG. 8 is a functional block diagram of a server.

As shown in FIG. 8, the server 10 includes an environmental information acquirer 12, an environmental information database 14, a route generator 16, and a communication unit 18.

Figure 9:
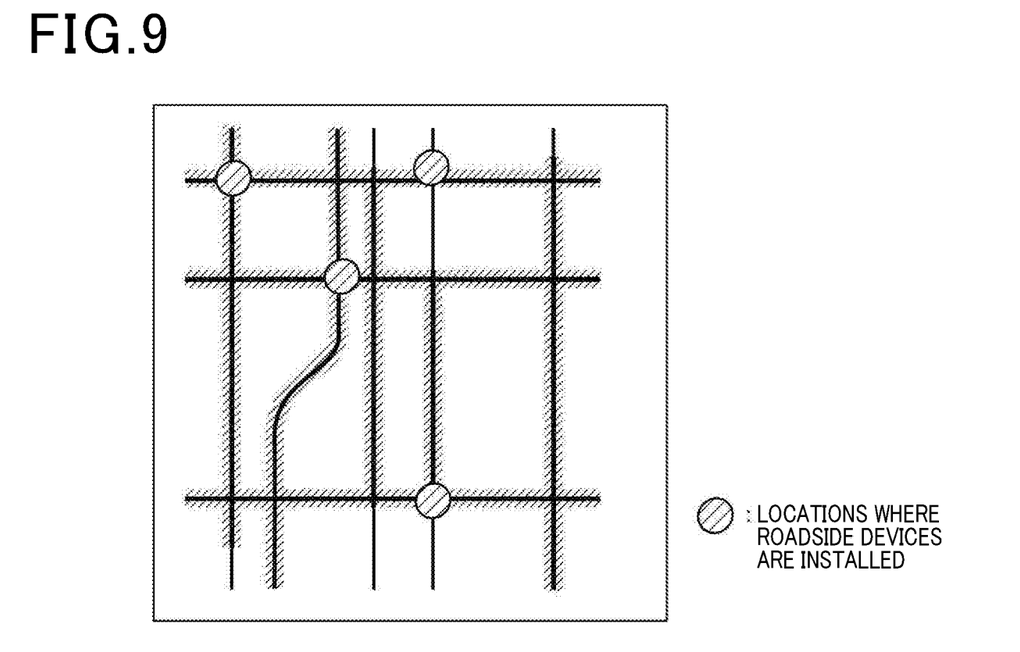
FIG. 9 is an illustration of an environmental information database.
Figure 10:
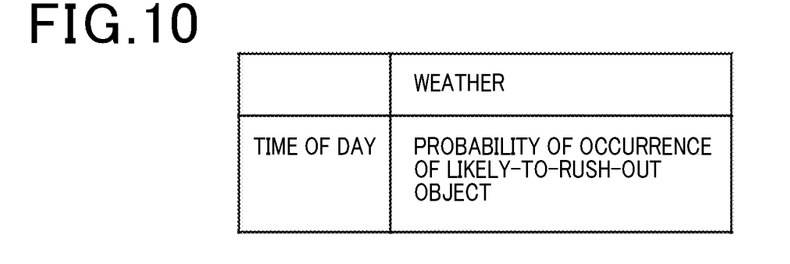
FIG. 10 is an illustration of a probability of occurrence of a likely-to-rush-out object stored in the environmental information database.

The environmental information acquirer 12 is configured to collect a result of extraction of a likely-to-rush-out object received from each roadside device 40 via the communication unit 18, and for each of the potentially risky areas where the roadside devices 40 are placed (see FIG. 9), calculate a probability of occurrence of a likely-to-rush-out object for each combination of event information (for example, holiday promenade), commuting information, places (for example, near exit/entrance), weather and time of day (for example, in units of ten minutes), and stores calculation results in the environmental information database 14 (see FIG. 10). For example, for each combination of weather and time of day, the environmental information acquirer 12 counts the number of extractions of a likely-to-rush-out object, and based on the count value, calculates a probability of occurrence of a likely-to-rush-out object.

For a potentially risky area where no roadside device 40 is placed, a probability of occurrence of a likely-to-rush-out object may be set to 1.

The route generator 16 is configured to, upon receiving the reassurance indicator, the destination, and the current location from one of the onboard devices 60 via the communication unit 18, calculates a cost for each route candidate under assumption that avoidance control is to be or not to be performed in a respective one of potentially risky areas along the route candidate in response to the reassurance indicator, and select an optimum route from the route candidates to the destination based on the calculated costs for the respective route candidates.

More specifically, if the reassurance indicator is security-oriented, the route generator 16 calculates, for each route candidate, a passage cost for each potentially risky area along the route candidate under assumption that avoidance control is to be performed in the potentially risky area irrespective of probability of occurrence of a likely-to-rush-out object.

If the reassurance indicator is speed-oriented, the route generator 16 calculates, for each route candidate, a passage cost for each potentially risky area along the route candidate under assumption that avoidance control is to be performed in potentially risky areas along the route candidate, for which the probability of occurrence of a likely-to-rush-out object is equal to or greater than a threshold, and avoidance control is not to be performed in potentially risky areas along the route candidate, for which the probability of occurrence of a likely-to-rush-out object is less than the threshold.

In such a way, for each route candidate, the route generator 16 calculates a cost responsive to a passage cost for each potentially risky area along the route candidate and a length of the route candidate. The route generator 16 selects an optimum route from the route candidates to the destination using the calculated costs for the respective route candidates, and transmits via the communication unit 18 the optimum route to the onboard device 60 having transmitted the reassurance indicator, the destination, and the current location.

Figure 11:
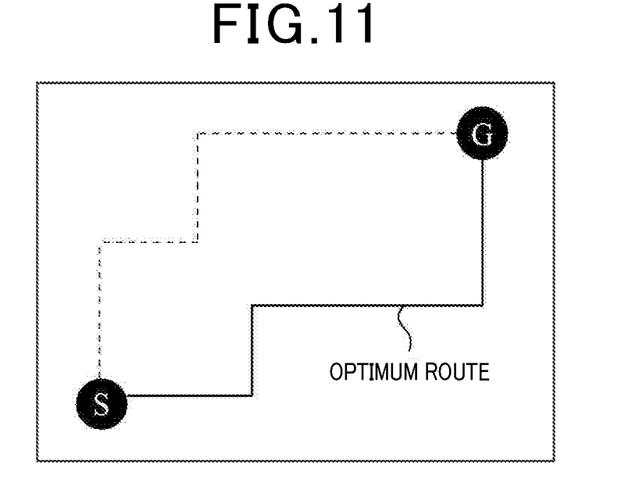
FIG. 11 is an example screen displaying an optimum route.

Upon receipt of the optimum route, the onboard device 60 having transmitted the reassurance indicator, the destination, and the current location controls the own vehicle to perform self-driving along the optimum route. In one alternative embodiment, as shown in, FIG. 11, the optimum route to the destination may be displayed on the display 66 of the onboard device 60.

Operations of the self-driving assistance system 1 of the present embodiment as shown in FIG. 3 will now be described.

Each of the roadside devices 40 located in the respective potentially risky areas transmits to the server 10 a result of extraction of a likely-to-rush-out object at any time.

The environmental information acquirer 12 of the server 10 collects extraction results of likely-to-rush-out objects received from the roadside devices 40 via the communication unit 18, and for each of the roadside devices 40 located in the respective potentially risky areas, calculates a probability of occurrence of a likely-to-rush-out object for each combination of weather and time of day. The environmental information acquirer 12 of the server 10 stores calculation results in the environmental information database 14.

In addition, when a vehicle carrying the onboard device 60, such as a taxi having a self-driving function, has picked up a passenger, the display 66 displays the passenger preference input interface 66A and receives a reassurance indicator from the passenger. The display 66 as shown in FIG. 4 displays the destination setting interface to receive a destination. The display 66 transmits the received reassurance indicator and the destination, and the current location to the server 10 via the communication unit 68.

Figure 12:
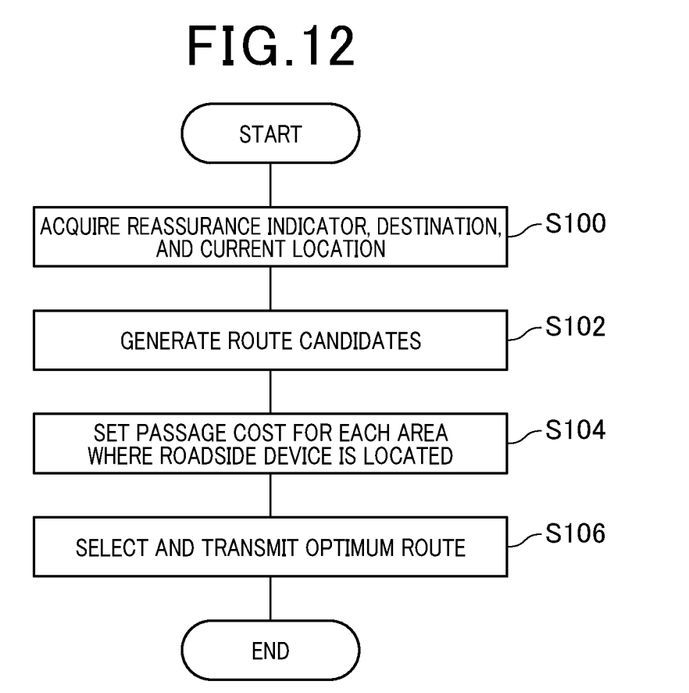
FIG. 12 is a flowchart of a route generation process.

Upon transmission of the reassurance indicator, the destination, and the current location from the onboard device 60 to the server 10, the server 10 performs a route generation process shown in FIG. 12.

The route generation process shown in FIG. 12 will now be described.

First, at step S100, the route generator 16 acquires the reassurance indicator, the destination, and the current location received via the communication unit 18 from the onboard device 60 having transmitted the reassurance indicator, the destination, and the current location.

At step S102, the route generator 16 generates a plurality of route candidates from the current location to the destination with reference to map data.

At step S104, the route generator 16 sets a passage cost for each potentially risky area along each route candidate in response to the reassurance indicator and the probability of occurrence of a likely-to-rush-out object.

At step S106, using a cost for each route candidate responsive to the passage cost calculated at step 104 for each potentially risky area along the route candidate and a length of the route candidate, the route generator 16 selects an optimum route from the route candidates to the destination, and transmits via the communication unit 18 the optimum route to the onboard device 60 having transmitted the reassurance indicator, the destination, and the current location. Thereafter, the route generation process ends.

Upon receipt of the optimum route from the server 10, the onboard device 60 controls the own vehicle to perform self-driving along the optimum route.

If a potentially risky area where the roadside device 40 is located is present forward of the own vehicle along the optimum route, the onboard device 60 transmits a safety check request to the roadside device 40 via the communication unit 68.

Upon receipt of the safety check request via the communication unit 45, the roadside device 40 evaluates based on a result of extraction by the likely-to-rush-out object extractor 42 whether the vehicle carrying the onboard device 60 having transmitted the safety check request is likely to collide with another moving object. The roadside device 40 transmits to the onboard device 60 having transmitted the safety check request an evaluation result via the communication unit 45.

Figure 13:
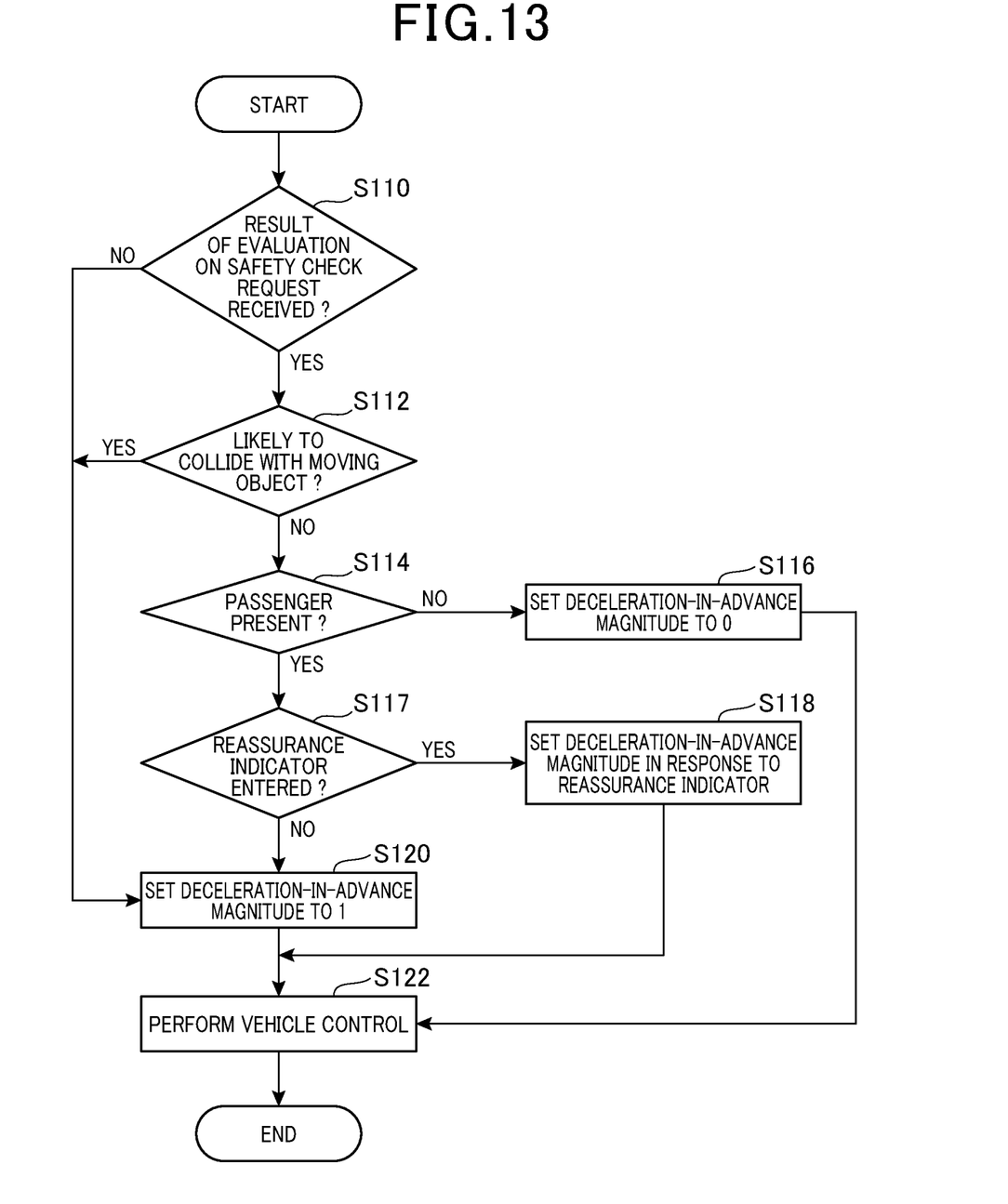
FIG. 13 is a flowchart of a deceleration-in-advance control process.

If a potentially risky area where the roadside device 40 is located is present forward of the own vehicle along the optimum route, the onboard device 60 performs deceleration-in-advance control process shown in FIG. 13 before entering the potentially risky area.

The deceleration-in-advance control process will now be described with reference to FIG. 13.

At step S110, the vehicle controller 64 determines whether a collision evaluation is available from the roadside device 40 located in the potentially risky area. If no roadside device 40 is placed in the potentially risky area or if the collision evaluation could not be transmitted to the vehicle controller 64, then the process flow proceeds to step S120. If a collision evaluation has been received from the roadside device 40 located in the potentially risky area, then the process flow proceeds to step S112. At step S112, the collision evaluation result is checked. If the own vehicle is unlikely to collide with another moving object, then the process flow proceeds to step S114. If the own vehicle is likely to collide with another moving object, then the process flow proceeds to step S120.

At step S114, the vehicle controller 64 checks the presence or absence of a passenger. If no passenger is onboard, the vehicle controller 64 sets the deceleration-in-advance magnitude to 0 at step S116. Thereafter, the process flow proceeds to step S122.

If a passenger is onboard, then at step S117 the vehicle controller 64 determines whether the reassurance indicator has been entered by the passenger. If the reassurance indicator has been entered by the passenger, then at step S118 the vehicle controller 64 sets the deceleration-in-advance magnitude in response to the reassurance indicator. Thereafter, the process flow proceeds to step S122.

If no reassurance indicator has been entered by the passenger, the process flow proceeds to step S120.

At step S120, the vehicle controller 64 sets the deceleration-in-advance magnitude to 1. Subsequently, the process flow proceeds to step S122.

At step S122, the vehicle controller 64 controls the own vehicle to perform avoidance control in response to the deceleration-in-advance magnitude set at step S116, S118, or S120, or otherwise controls the own vehicle to perform no avoidance control. Thereafter, the deceleration-in-advance control process ends.

Figure 14:
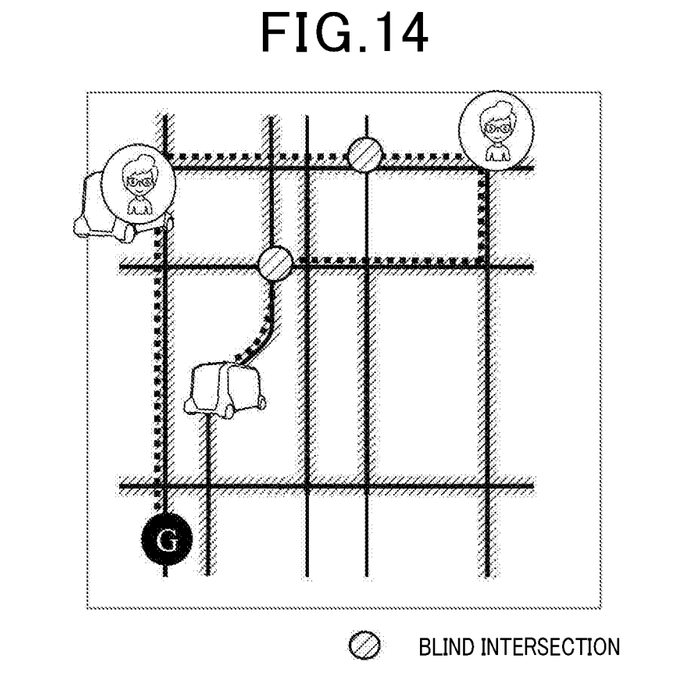
FIG. 14 is an illustration of performing deceleration-in-advance along a route.

In the above deceleration-in-advance control process, as shown in FIG. 14, when a taxi having the onboard device 60 is carrying no passenger, the taxi passes a blind intersection without decelerating if it has been confirmed that the taxi is unlikely to collide with another moving object at the blind intersection. When a taxi having the onboard device 60 is carrying a passenger that is concerned with security, the taxi decelerates before reaching a blind intersection and passes the blind intersection even if it has been confirmed that the taxi is unlikely to collide with another moving object at the blind intersection. Therefore, avoidance control parameters used for route planning to pick up a passenger and avoidance control parameters used for route planning to carry a passenger are different.

As described above, each onboard device of the self-driving assistance system of the present embodiment is configured to receive from a passenger a reassurance indicator representing a preference of the passenger for security. The onboard device is configured to, in response to, in the presence of a passenger onboard, receiving from the roadside device located in a potentially risky area forward of the own vehicle an evaluation result that the own vehicle is unlikely to collide with another moving object, perform avoidance control in the potentially risky area in response to the reassurance indicator. This allows vehicle control responsive to an easily entered preference for security or vehicle control which can provide, in response to the presence or absence of a passenger, a feeling of security to the passenger. In addition, to perform deceleration-in-advance so as not to scare the passenger, deceleration-in-advance is performed in response to desired a feeling of security or desired speed.

Modifications

Figure 15:
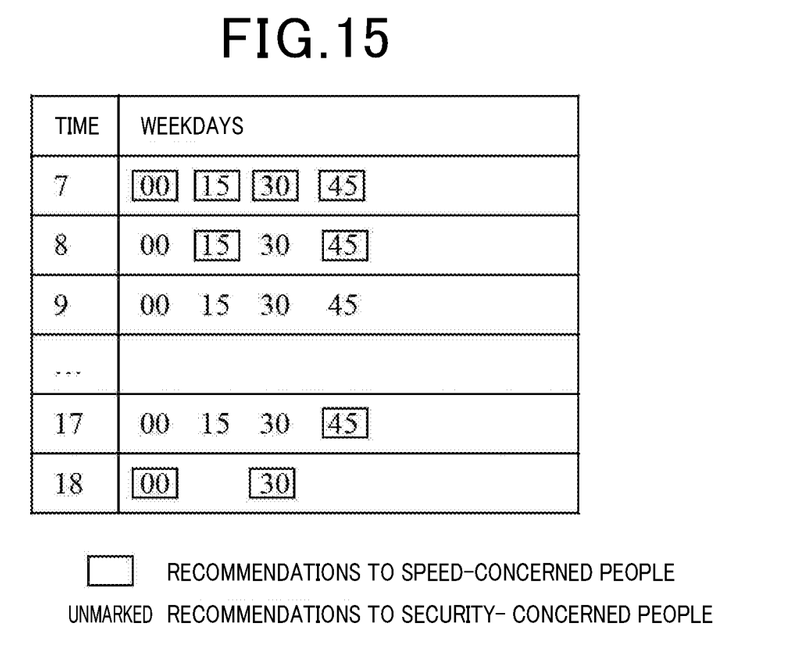
FIG. 15 is an example of a bus timetable.

In the specific embodiment described above, the onboard device is mounted to a taxi having a self-driving function. In an alternative embodiment, the onboard device may be mounted to a bus having a self-driving function, where the reassurance indicator may be set by crew or administrator of the bus. Preferably, in an example bus timetable as shown in FIG. 15, recommendations to speed-conscious people and recommendations to security-conscious people may be displayed in a distinguishable manner. In addition, so as not to scare passengers, the onboard device or a smartphone application performs either or both of the following processes (1)-(2) before reaching a potentially risky area.

(1) A message "A safety check of the following intersecting road condition has been conducted. This vehicle will not decelerate before the intersection." may be provided via audio broadcast or displayed on the display 66.

Figure 16:
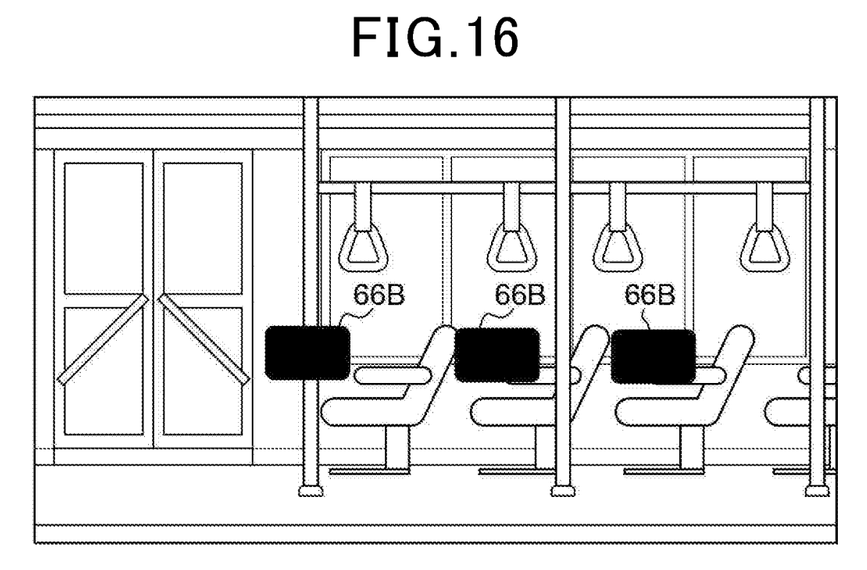
FIG. 16 is an illustration of displays for guiding attention of passengers.

(2) A screen-display may guide the passengers' attention to the interior of the vehicle. For example, the vehicle controller 64 may control the display 66 or a display installed for in-vehicle broadcast to display a screen introducing the advertisement or sightseeing information, so as to allow the passenger to get a coupon by clicking an advertisement. Preferably, as shown in FIG. 16, the screens 66B (serving as a notifier) may be provided at positions of drooping heads of passengers. Therefore, the vehicle controller 64 may also serve as a display controller.

In the specific embodiment described above, the onboard device is mounted to a vehicle having a self-driving function. In an alternative embodiment, the onboard device may be mounted to a vehicle having no self-driving function.

In the specific embodiment described above, the server is located within the control center. In an alternative embodiment, the server may be equipped at the road side. In another alternative embodiment, one of the onboard devices may have a similar function to the server.

Various types of processors other than the CPU may execute various processes implemented by the CPU executing software (programs) in the aforementioned embodiment. A dedicated electric circuit which is a processor having a circuit configuration designed as a dedicated processor in order to execute a specific process, such as application specific integrated circuit (ASIC) or programmable logic device (PLD) of which a circuit configuration can be changed after field-programmable gate array (FPGA) is manufactured is used as the processor in this case. The various processes may be executed by one of these various processors, or may be executed by a combination of two or more processors of the same type or different types (for example, a plurality of FPGAs, and a combination of the CPU and the FPGA). Hardware structures of these various processors are more specifically electric circuits in which circuit elements such as semiconductor elements are combined.

Although it has been described in the aforementioned embodiment that the program is pre-stored (installed) in the ROM, the present disclosure is not limited thereto. The program may be provided in a form recorded on a non-transitory tangible storage medium, such as a compact disk read only memory (CD-ROM), a digital versatile disk read only memory (DVD-ROM), and a universal serial bus (USB) memory. The program may be downloaded from an external device via a network.

What is claimed is:

1. An apparatus for controlling driving of a vehicle, comprising:
an input interface configured to receive a reassurance indicator entered by a passenger of the vehicle, wherein, in performing of an avoidance control by the vehicle, the reassurance indicator indicates a preference of the passenger for whether the avoidance control should be more security-oriented or more speed-oriented, wherein a deceleration rate of the vehicle for a more security-oriented avoidance control is less than a deceleration rate of the vehicle for a more speed-oriented avoidance control, wherein the reassurance indicator comprises a value within a range in which security-oriented and speed-oriented are extents of the range;
a non-transitory memory storing one or more computer programs; and
a processor executing the one or more computer programs to:
communicate with a plurality of roadside devices located in respective potentially risky areas where the vehicle may collide with a moving object, each roadside device being configured to evaluate the collision possibility with the moving object; and
in response to receiving an evaluation result from a roadside device located in the potentially risky area forward of the vehicle showing that the vehicle is unlikely to collide with the moving object in the potentially risky area forward of the vehicle, perform the avoidance control to control driving of the vehicle according to the reassurance indicator.

2. The apparatus according to claim 1, wherein
the processor executes the one or more computer programs to
in response to receiving the evaluation result from the roadside device located in the potentially risky area forward of the vehicle showing that the vehicle is unlikely to collide with the moving object in the potentially risky area forward of the vehicle, perform the avoidance control to control driving of the vehicle according to the reassurance indicator.

3. The apparatus according to claim 1, wherein
the processor executes the one or more computer programs to calculate a cost for each of a plurality of route candidates to a destination under assumption that avoidance control is to be or not to be performed in a respective one of potentially risky areas along the route candidate in response to the reassurance indicator, and select an optimum route from the route candidates to the destination based on the calculated costs.

4. The apparatus according to claim 3, wherein
the processor executes the one or more computer programs to
calculate the cost for each of the plurality of route candidates to the destination under assumption that the avoidance control is performed according to the reassurance indicator, and select an optimum route from the route candidates to the destination based on the calculated costs.

5. The apparatus according to claim 1, wherein
the processor executes the one or more computer programs to
receive the reassurance indicator input from the passenger of the vehicle.

6. The apparatus according to claim 1, wherein
the processor executes the one or more computer programs to
in response to the vehicle controller performing no avoidance control in the potentially risky area forward of the vehicle, provide a notification that the vehicle is unlikely to collide with the moving object.

7. The apparatus according to claim 1, wherein
the processor executes the one or more computer programs to
in response to performing no avoidance control in the potentially risky area forward of the vehicle, control a display to display a screen for guiding passenger's attention to an interior of the vehicle.

8. A method for controlling driving of a vehicle, comprising:
receiving a reassurance indicator entered by a passenger of the vehicle, the reassurance indicator representing the preference of the passenger for security and taking a value indicative of a balance between security-oriented and speed-oriented;
communicating with a plurality of roadside devices located in respective potentially risky areas where the vehicle may collide with a moving object, each roadside device being configured to evaluate the collision possibility with the moving object; and
in response to receiving an evaluation result from the roadside device located in the potentially risky area forward of the own vehicle showing that the own vehicle is unlikely to collide with the moving object in the potentially risky area forward of the vehicle, performing avoidance control to control driving of the vehicle according to the reassurance indicator.

9. A non-transitory computer readable medium having stored thereon instructions executable by a computer to cause the computer to perform functions comprising:
receiving a reassurance indicator entered by a passenger of a vehicle, wherein, in performing of an avoidance control by the vehicle, the reassurance indicator indicates a preference of the passenger for whether the avoidance control should be more security-oriented or more speed-oriented, wherein a deceleration rate of the vehicle for a more security-oriented avoidance control is less than a deceleration rate of the vehicle for a more speed-oriented avoidance control, wherein the reassurance indicator comprises a value within a range in which security-oriented and speed-oriented are extents of the range;
communicating with a plurality of roadside devices located in respective potentially risky areas where the vehicle may collide with a moving object, each roadside device being configured to evaluate the collision possibility with the moving object; and
in response to receiving an evaluation result from a roadside device located in the potentially risky area forward of the vehicle showing that the vehicle is unlikely to collide with the moving object in the potentially risky area forward of the vehicle, performing the avoidance control to control driving of the vehicle according to the reassurance indicator.

* * * * *